United States Patent
Ron et al.

(10) Patent No.: US 10,320,887 B2
(45) Date of Patent: Jun. 11, 2019

(54) INTEGRATING CLOUD SERVICE FUNCTIONALITY BY USING DOCUMENT METADATA

(71) Applicant: Oracle International Corporation, Redwood Shores, CA (US)

(72) Inventors: Juan Allo Ron, Foster City, CA (US); Pablo Schmid, Foster City, CA (US); Ganga Prasad Sah, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/498,125

(22) Filed: Apr. 26, 2017

(65) Prior Publication Data
US 2018/0081641 A1    Mar. 22, 2018

Related U.S. Application Data

(60) Provisional application No. 62/395,870, filed on Sep. 16, 2016.

(51) Int. Cl.
*G06F 9/445* (2018.01)
*H04L 29/08* (2006.01)
*G06F 8/20* (2018.01)

(52) U.S. Cl.
CPC .............. *H04L 67/10* (2013.01); *G06F 8/20* (2013.01); *H04L 67/16* (2013.01)

(58) Field of Classification Search
CPC . G06F 8/61; G06F 9/4411; G06F 8/60; G06F 8/62; H04L 29/08981
USPC .................................................. 717/171–176
See application file for complete search history.

(56) References Cited

U.S. PATENT DOCUMENTS

| | | | |
|---|---|---|---|
| 9,838,370 B2 * | 12/2017 | Doering | G06Q 10/06315 |
| 2010/0318649 A1 * | 12/2010 | Moore | G06F 11/30 709/224 |

\* cited by examiner

*Primary Examiner* — Chuck O Kendall
(74) *Attorney, Agent, or Firm* — Trellis IP Law Group, PC

(57) ABSTRACT

An example system and method for facilitating integrating functionality of different cloud computing environments. A particular example embodiment includes mechanisms for integrating a document cloud service with a process cloud service, such that components, e.g., documents, of software processes developed and/or implemented via the process cloud service can leverage the document cloud service and be maintained thereby. End users and/or software developers may now define folder structures governed by a document cloud service, where the folder structures and accompanying folders and documents may be automatically generated, maintained, and accessed via the process cloud service.

20 Claims, 8 Drawing Sheets

Edit Documents Root Folders

* Application Folder
  LoanRequest

* Instance Folder
  LoanRequest   {instance.id}

* Choose Startup Folder
  Default

The startup folder will be available when starting a process.

Save

Create Folder

* Name
  (new folder name)

Description
(enter description)

* Folder Access Type
  Contributor

√ Contributor
Downloader
Viewer
None

Create

FIG. 4

INTEGRATING CLOUD SERVICE FUNCTIONALITY BY USING DOCUMENT METADATA

CROSS REFERENCES TO RELATED APPLICATIONS

This application claims priority from U.S. Provisional Patent Application Ser. No. 62/395,870, entitled DOCUMENT CLOUD SERVICES AND PROCESS CLOUD SERVICES MANAGED FOLDERS, filed on Sep. 16, 2016 (Trellis ref ORACP0168P), which is hereby incorporated by reference as if set forth in full in this application for all purposes.

This application is related to the following applications: U.S. Provisional Application Ser. No. 62/395,382, entitled DOCUMENT AND FOLDER INITIATED PROCESSES, filed on Sep. 16, 2016 (Trellis ref ORACP0164P), and U.S. Provisional Patent Application Ser. No. 62/395,873, entitled OSN/PCS CONVERSATION INTEGRATION, filed on Sep. 16, 2016 (Trellis ref ORACP0169P), and U.S. Provisional Patent Application Ser. No. 62/395,913, entitled AUTOMATICALLY MAPPING DATA WHILE DESIGNING PROCESS FLOWS, filed on Sep. 16, 2016 (Trellis ref ORACP0170P), which are hereby incorporated by reference as if set forth in full in this application for all purposes.

BACKGROUND

The present application relates to computing, and more specifically to cloud-based systems, services, and accompanying methods and data storage mechanisms that are usable to develop and run software applications and associated process flows, i.e., sequences of computing tasks or activities.

Mechanisms for providing efficient cloud-based software development functionality are employed in various demanding applications, including integrated development environments for implementing process-based enterprise software applications, social network applications, general document synchronization applications, and so on. Such applications often demand efficient mechanisms for facilitating use of stored data by software applications during development (design time) and runtime.

Efficient data storage and handling mechanisms can be particularly important in enterprise applications, which can involve collaborative manipulation of various documents that may be part of one or more process flows (e.g., flows described by Business Process Model and Notation (BPMN) semantics). The process flows may demand manipulation of stored documents, folders, and metadata, including data storage locations.

Note that conventionally, documents and other attachments to a process or process flow are stored in a database Binary Large OBject (BLOB), where a BLOB may be any collection of binary data stored as a single entity in a database. BLOBs are often managed and accessed using a DataBase Management System (DBMS). Accordingly, documents used by a given process-based software application are often represented as a flat list stored as a database BLOB.

Conventionally, software developers may subscribe to certain cloud services (and accompanying integrated development environments) that include functionality for facilitating development of software applications and storage of associated files (e.g., using BLOBs). A cloud service that is configured for software application development (e.g., development of process flows) and/or use is called a Process Cloud Service (PCS) herein.

A PCS may employ a networked database to store files and other objects used by a given software application being developed. Server-side development environments may be accessible to developers via a browser. The development environments may be backed by a PCS, such that developed software application files are stored using one or more BLOBs of a PCS database.

However, conventionally, specialized PCS databases and accompanying BLOBs often lack certain features and functionality that may be particularly useful to developers and associated software applications and accompanying process flows.

SUMMARY

An example system and method facilitates integrating functionality of different cloud computing environments to facilitate software application development, implementation, and use. A particular example embodiment includes mechanisms for integrating a Document Cloud Service (DCS, also abbreviated DOCS) with a Process Cloud Service (PCS), such that components, e.g., documents, of software processes developed and/or implemented via the PCS can leverage the DCS and be maintained thereby. End users and/or software developers may now define folder structures governed by a DCS, such that the folder structures may be automatically generated, maintained, and accessed via the PCS and accompanying processes.

Another example embodiment includes employing a first cloud service (e.g., a PCS) to provide software functionality for enabling development of one or more enterprise software applications; using a second cloud service (e.g., a DCS) to provide document management functionality for facilitating management of one or more documents (e.g., files, folders, other computing objects, etc.); and integrating the first cloud service with the second cloud service such that document management functionality associated with the second cloud service is usable by software functionality of the first cloud service. The document management functionality includes providing metadata characterizing one or more documents associated with a software application to the software application at runtime of the software application.

In a more specific embodiment, User Interface (UI) display screens are provided to enable users to quickly update settings and permissions for documents that will be used at runtime. Rich document metadata derived through use of functionality afforded by a. DCS can be leveraged at runtime of a software application that has been developed using a PCS that leverages functionality of the DCS.

One or more Application Programming Interfaces (APIs) and/or other interfacing mechanisms may provide a UI model and associated functionality to manage metadata provided via the DCS. As part of DCS integration with a PCS, all PCS document content can be placed into structures maintained, at least in part, by the DCS. Users may employ UI display screens of the UI model to define folder structures that will be automatically created, maintained, accessed, and controlled by the process cloud.

Note that certain process-based software applications and associated processes (e.g., certain approval processes, such as a loan approval process) implemented by a process cloud may benefit by the ability to segregate documents into different folders and the ability to move documents into different folders, e.g., approved folders during implementation of the process. Such document segregation and folder manipulation activities may be difficult or impossible to perform using a conventional PCS that stores attachments (e.g., process-related documents) in a database BLOB or flat list without effective use of metadata and/or document organization structures. Note that conventional BLOB s often lack mechanisms for efficiently maintaining and organizing rich metadata or other information characterizing or describing a particular data organization for the data structure(s) accommodating the documents.

Accordingly, certain embodiments discussed herein address such problematic attachment-storage and organization mechanisms used in conventional PCS computing environments, in part, by efficiently integrating DCS management functionality with PCS functionality, thereby enabling software developers (and the business processes they develop using PCS functionality) to effectively leverage rich metadata functionality afforded by a DCS. Note that the rich metadata and associated functionality afforded by a DCS may particularly facilitate collection and management of file and object metadata, which can be particularly useful for implementation of process-based software applications and other applications involving use of content developed collaboratively by multiple network users.

A further understanding of the nature and the advantages of particular embodiments disclosed herein may be realized by reference of the remaining portions of the specification and the attached drawings.

BRIEF DESCRIPTION OF THE DRAWINGS

FIG. 3 shows a second example UI display screen that may be access from the first example UI display screen of FIG. 2 and that may be used for editing root folder metadata.

FIG. 4 shows a third example UI display screen that may be accessed from the first example UI display screen of FIG. 2 and that may be used for specifying metadata for a folder to be created.

FIG. 5 shows a fourth example UI display screen, which includes various UI controls and associated options, e.g., for specifying document folders and folder access types; specifying gateway conditions based on metadata, and so on.

DETAILED DESCRIPTION OF EMBODIMENTS

Figure 1:
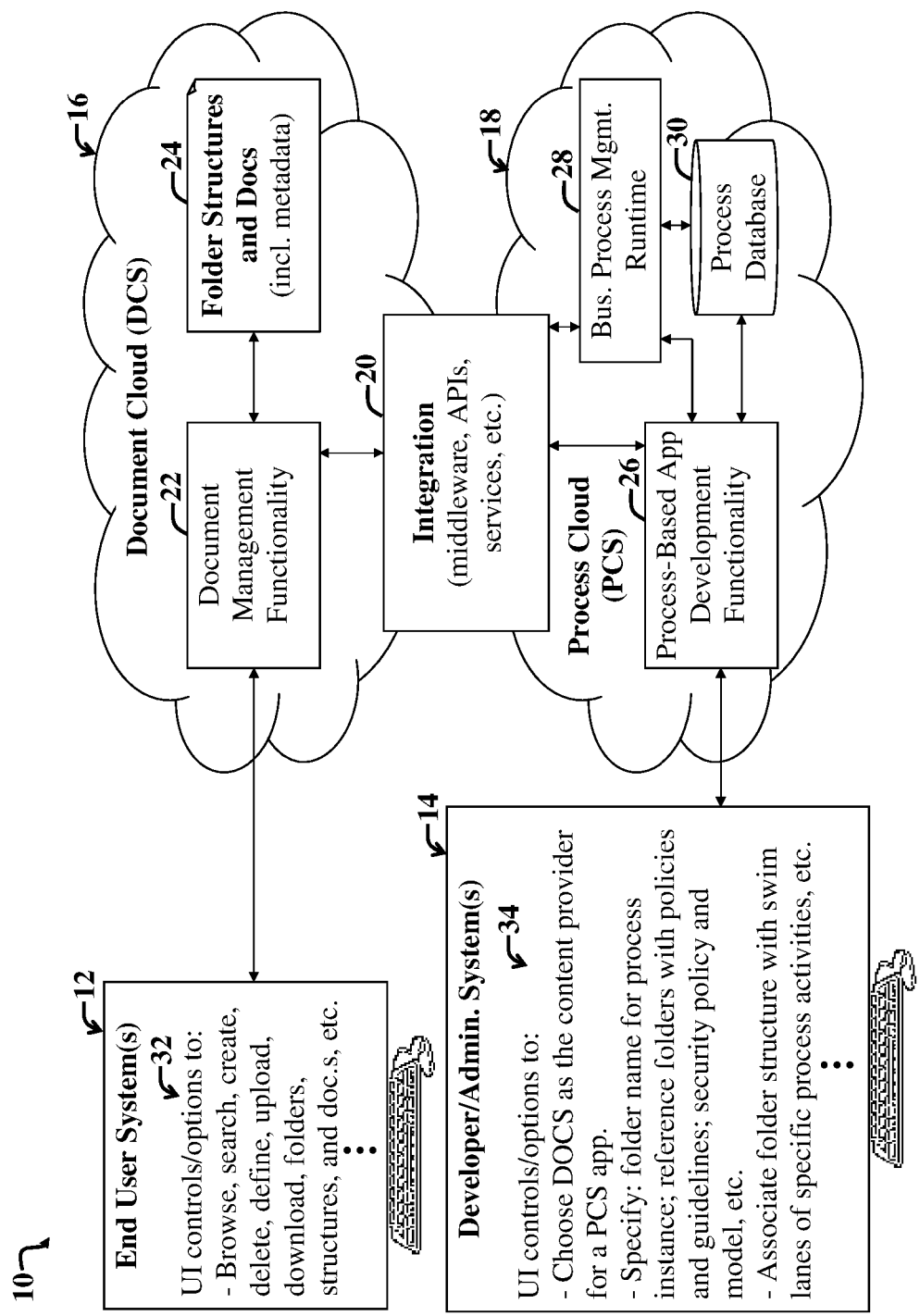
FIG. 1 is a first block diagram illustrating a first example system and accompanying computing environment enabling leveraging of functionality of a document cloud for use by a process cloud.

Conventionally, software developers may subscribe to certain cloud services to facilitate development of software applications and storage of associated files. A cloud service that is configured for software application or process flow development is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in a PCS database.

However, conventionally, specialized PCS databases often lack certain features and functionality that may be particularly useful to developers and associated software applications and accompanying process flows. Such features and functionality are provided via various embodiments discussed herein.

Note that the existence of (or lack of) effective business processes can make or break a business. An effective business process, e.g., one that delivers operational efficiency, business visibility, excellent customer experience, and agility, can provide an enterprise with a competitive edge.

Various embodiments discussed more fully below may significantly enhance Business Process Management (BPM) software-development and deployment, in party by facilitating systems integration, business activity monitoring (e.g., via dashboards), and providing rich process management capabilities. BPM software suites that enable integration between process clouds and document clouds, in accordance with embodiments discussed herein, may enable reduced software development implementation complexity, time, and costs. Both simple and complex processes can be more readily designed, deployed, and managed by using embodiments discussed herein.

Note that certain preexisting Document Cloud Services (DCSs, or DOCSs) may already provide various features and functionality for enabling information access and sharing. Furthermore, DCSs may employ permission controls (e.g., mechanisms for assigning user permissions to access data and software functionality in accordance with user login credentials, e.g., username and password) and associated encryption. A DCS may also enable document collaboration. However, conventional computing environments (e.g., a conventional process cloud computing environment) used to develop software applications often lack similar features of DCS computing environments.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.).

Accordingly, the term "software application" may also include networked software applications or integrated groups thereof.

Certain embodiments discussed herein are particularly useful for development and deployment of process-based software applications. A process-based software application may be any software application definable by one or more sequences of steps, also called software activities. A sequence of steps of a process-based software application may be called a process flow. Process flows are often modeled and illustrated via swim lanes in a User Interface (UI) display screen and using Business Process Model and Notation (BPMN) semantics. Process-based applications are often implemented via composite applications that may leverage different web services, Application Programming Interfaces (APIs), and so on, for different process steps.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment enabling leveraging of functionality of a document cloud 16 for use by a process cloud 18.

The example system 10 includes an example developer system 14 in communication with the process cloud 18, and an end user system 12 in communication with a document cloud 16. Note that while the end user system 12 is shown communicating with the document cloud 16, that the end user system 12 may also communicate with the process cloud 18. Similarly, the developer system 14 may also communicate with the document cloud 16, without departing from the scope of the present teachings.

The overall system 10 may represent a networked computing environment, such as a networked enterprise computing environment. Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For the purposes of the present discussion, when a user subscribes to document management functionality 22 of the document cloud 16, the user is said to subscribe to a Document Cloud Service (DCS). Similarly, when a developer subscribes to process cloud functionality 26 of the process cloud 18, the developer subscribes to a Process Cloud Service (PCS). Note that the term "cloud service" herein may include a collection of software functionality and need not refer to or be confused with a particular web service.

For the purposes of the present discussion, software functionality may be any function, capability, or feature, e.g., stored or arranged data, that is provided via computer code, i.e., software. Generally, software functionality may be accessible via use of a user interface and accompanying user interface controls and features and underlying software applications. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, interfacing different software components or other network resources, and so on.

The example document cloud 16 includes document management functionality 22 in communication with folder structures and documents 24. The document management functionality 22 may include MetaData Services (MDS) for characterizing folders and documents and associated structures 24 with various types of metadata (i.e., data about information, e.g., data characterizing folders, documents, and/or other content). The document management functionality 22 may further include software for generating one or more end user UI display screens 32 and accompanying UI controls and associated options. Example options include options to browser, create, delete, define, upload, download, etc., folders, structures, and documents, etc., as maintained via the folder structures and documents 24.

The example process cloud 18 includes the application development functionality 26 in communication with a process database 30 (e.g., for storing certain process definitions, etc.) and a business process management runtime engine or environment 28. An integration module 20 couples the process cloud functionality 26 with the document management functionality 22 of the document cloud 16, enabling the process cloud functionality 26 to leverage functionality, including metadata services, of the document cloud 16, to facilitate development, implementation, and deployment of software applications. The integration functionality 20 may include middleware, APIs, web services, and so on. Those skilled in the art with access to the present teachings may readily develop the integration module 20 to meet the needs of a given implementation, without undue experimentation.

Integration of the PCS 18 with the DCS 16, e.g., via the integration mechanisms 20, enables PCS content, e.g., documents and computing objects, to be placed into structures 24 that are maintained, at least in part, by the DCS 16. The integration module 20 includes interfacing code and associated mechanisms for providing a UI model and associated functionality to facilitate management of metadata provided via the DCS 16.

The UI model is leveraged by the PCS functionality 26 to facilitate generation of the various UI controls 34 available via the developer system(s) 14.

Accordingly, users (e.g., software application developers) may employ UI display screens of the UI model to define folder structures that will be automatically created, maintained, accessed, and controlled by the process cloud 18 and accompanying PCS. Furthermore, end users employing the end user systems 12 may employ display screens (e.g., based on a UI model provided by the document management functionality 22) to define folder structures that may be used by the PCS 18.

The process cloud functionality 26 further includes computer code for enabling generation of various UI controls and associated options 34 and functionality presented via the developer system 14. Examples of UI controls and associated options include options to choose a DCS as the content provider for a PCS software application; options to specify a folder name for a process instance; options to specify a reference folder with policies and guidelines for software development; options to specify a security policy and/or model to use with the software application under development; options to associate a folder structure with swim lanes describing a specific process and associated process activities or tasks; options to create one or more place holders in computer code of a software application, wherein the one or more place holders are for one or more documents that are part of a process flow of the software application; options to facilitate creation of a folder structure defined by folder metadata during instantiation and orchestration of one or more processes of the software application; options to enable specifying that one or more existing documents or folders shall be used in a process flow of the software application; options to enable use of a preexisting document folder structure in a process or process flow of the software application, wherein the preexisting document folder structure has been initially constructed for organizing documents that are not specifically developed or designed for a given software process or process flow; options to facilitate creation of a folder or document attribute-based expressions in a process or process flow of the software application; options to facilitate creation of an expression in a PCS for any gateway condition or activity based on one or more attributes of one or more documents, thereby enabling decisions and data updates to be based on the attributes; options to facilitate routing a process flow of the software application to different sets of tasks or activities (e.g., loan processing departments) based on one or more attributes, and so on.

For the purposes of the present discussion, a gateway may be any step or point in a process flow, e.g., as may be illustrated by a BPMN process model, which involves a merging and/or joining of paths in a process flow. For example, an outcome of a gateway step may result in selection of a subsequent step from among plural possible steps, wherein the selection is based upon the outcome. Hence, as represented in a BPMN process model, a gateway may be used to represents a branching step in the process model, past which more than one possible paths or sequences of process steps are possible.

Accordingly, a gateway condition may be any criterion or criteria used to determine the outcome of the gateway step, thereby resulting in selection of one or more of the plural output paths (also called outbound paths) in accordance with an outcome of the gateway step, the outcome resulting from evaluation of the criterion or criteria with reference to an input signal or data (as input to the gateway step in the process).

Note that conventionally, a process cloud stores documents pertaining to software applications, such as folders with computer code, business objects used by the software applications, and so on, in an embedded process database 30 with relatively limited document management functionality. Documents can be an integral part of a process cloud service, as documents are commonly used in various types of software applications, such as those involving approval flows.

The present example embodiment employs the integration module 20 and accompanying APIs, web services, and/or other mechanisms to enable the process cloud functionality 26 to leverage the document management functionality 22. The leveraged document management functionality 22 may include, for example, document cloud content management services that may provide richer capabilities to create, manage, share and view documents than may otherwise be afforded through use of a conventional process cloud database.

Accordingly, capabilities and functionality offered by the process cloud 18 and accompanying services and functionality 26 (when integrated with document management functionality and associated services of the document cloud 16) provide developers and process cloud modelers with a rich, seamless, and efficient document interaction experience.

Generally, document clouds may incorporate functionality for adding rich metadata documents and folders. The integration of process cloud functionality 22 and document cloud functionality 26 as discussed herein may allow developers to not only store documents in the document cloud 16 (e.g., among the folder structures and documents 24) but also to access and use and/or manipulate the documents using the process cloud 18 and associated functionality 26.

In addition, metadata from the document cloud 16 can be created, accessed, and edited from the process cloud 18. Accordingly, software applications and associated processes and events developed using the process cloud 18 may now leverage rich metadata afforded by documents maintained in the document cloud 16. Furthermore, documents used by or otherwise related to a given software application may be stored among the folder structures and documents 24 of the document cloud 16. For example, form start events and human tasks may now have document attachments characterized by the same or similar rich metadata as documents 24 of the document cloud 16.

Accordingly, document content of the process cloud 18, including content that may conventionally be stored in the process database 30, can be stored via the document cloud 16. A developer may employ the developer system 14 and accompanying UI display screens 34 to define a folder structure (e.g., a folder structure of the folder structures and documents 24) that will be automatically created, maintained, accessed, and controlled by the process cloud 18 and associated functionality 26 and process cloud services.

In the present example embodiment, the integration module 20 includes additional code for enabling the PCS 18 to communicate with the DCS 16, so as to provide one or more UI controls 34 to enable creation of one or more place holders for one or more DCS documents 24 in computer code of a process flow of process-based software application to be implemented via the PCS, e.g., via the BPM runtime system 28.

Additional UI controls of the controls 34 facilitate creation of one or more folder structures, which may be defined by folder metadata, during instantiation and orchestration of one or more processes of the process-based software application. The PCS software application development functionality 26 may further include computer code for dynamically creating one or names for one or more folders of the folder structure based on one or more variables of the software application that have been populated with one or more software expressions.

Additional UI controls 34 enable specifying that one or more existing documents or folders shall be used in a process flow of the software application. Additional UI controls may enable use of a preexisting document folder structure in a process or process flow of the software application, wherein the preexisting document folder structure has been initially constructed for organizing documents that are not specifically developed or designed for a given software process or process flow. Additional UI controls 34 may facilitate creation of a folder or document attribute-based expressions in a process or process flow of the software application, as discussed more fully below.

In summary, the example process cloud 18 and PCS provided thereby employs an integration 20 with the document cloud 16 and PCS provided thereby, to enable the PCS 18 to store documents (e.g., folders with computer code, such as folders with computer code, business objects used by the software applications, and so on) using the folder structures and documents 24 of the DCS 16.

Note that data and associated documents can provide important functionality for a PCS, as such documents can be particularly useful during various process-based software applications, e.g., applications used to guide and/or implement approval flows, as discussed more fully below.

Recall that a conventional PCS may typically store documents only in a PCS database using mechanisms embedded in the PCS, e.g., using PCS database BLOBs. However, cloud content management services afforded by the DCS 16 provide richer capabilities to create, manage, share, and view documents than the services conventionally afforded by a PCS.

By integrating functionality 26 of the PCS 18 with functionality 22 of the DCS 16, the present example embodiment enables a rich and seamless documentation interaction experience for both developers using the developer system(s) 14 and users employing the end user system(s) 12.

Enterprises using certain preexisting DCSs have the ability to add rich metadata to their documents and folders. A process-based software application implemented via a PCS may include form start events and specify human tasks that involve document attachments. Such document attachments associated with or used by a given process-based software application can now leverage similarly rich (or more enhanced) metadata as available via a DCS, in a PCS computing environment.

The present example embodiment, i.e., the system 10, discloses integration of PCS 18 and DCS 16 and associated clouds, thereby allowing enterprises to both store documents in the DCS 16 (e.g., via the folder structures and documents 24) and also to selectively access the documents via one or more process-based software applications and/or development functionality 26 of the PCS 18. In addition, metadata from the DCS 16 can be created, edited, and accessed via the PCS 18.

Figure 2:
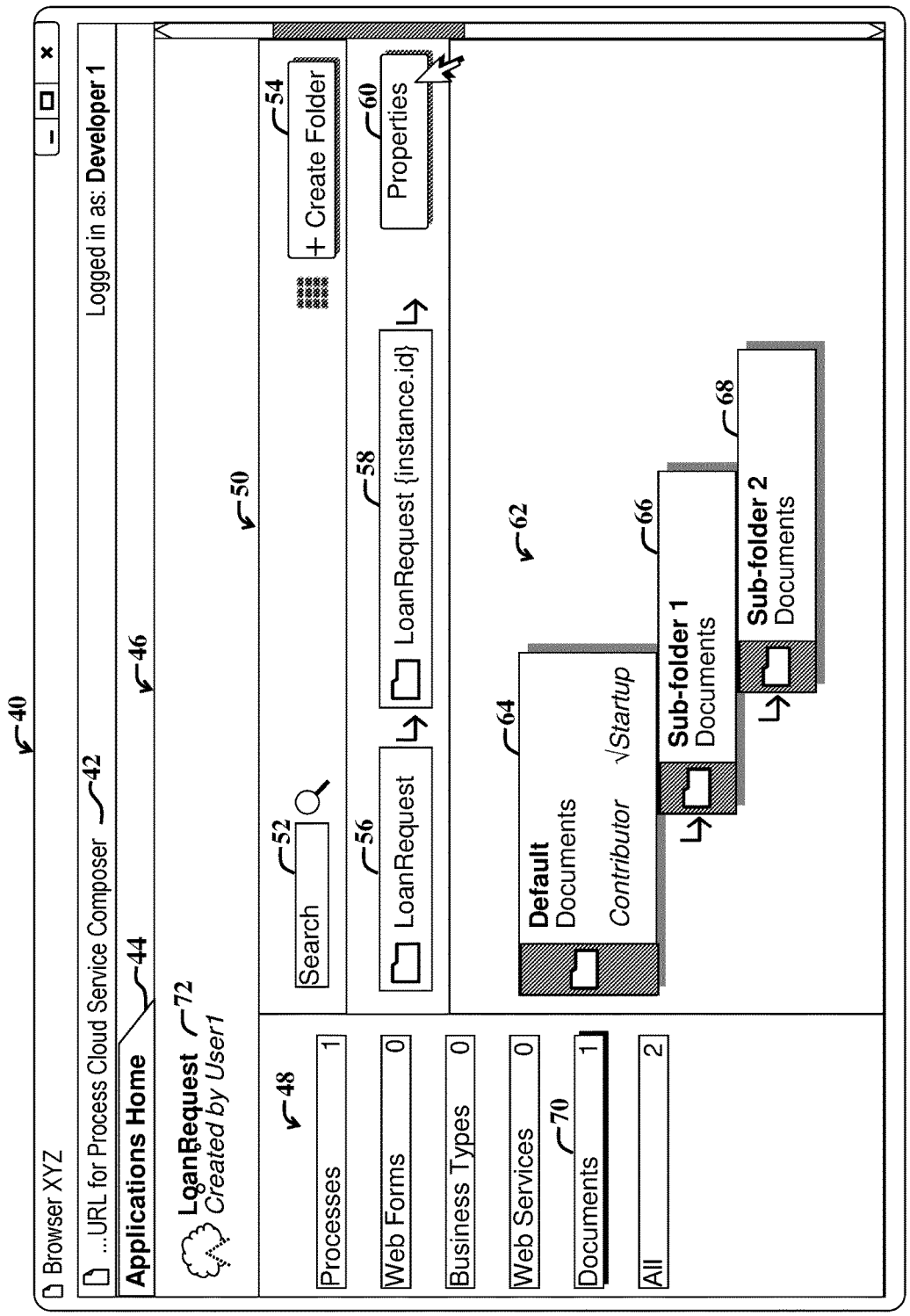
FIG. 2 shows a first example User Interface (UI) display screen that may be displayed via the developer system 14 of FIG. 1.

FIG. 2 shows a first example User Interface (UI) display screen 40 that may be displayed via a browser running on the developer system 14 of FIG. 1. For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The example UI display screen 40 represents a browser window appearing after a user (e.g., developer) has browsed to a Uniform Resource Locator (URL) 42 for a PCS software application (e.g., a PCS composer application) for facilitating development of process-based software applications.

In the present example embodiment, the PCS composer application associated with the URL 42 presents an example home page presented via a home tab 44 and accompanying UI display screen section 46.

The example UI display screen section 46 includes various UI controls 48 for accessing additional UI controls pertaining to processes, web forms, business types, web services, and documents 70. Presently, a documents option 70 is selected, resulting in display of a documents section 50.

The example documents section 50 includes a search field 52 for facilitating for searching for documents for use by an associated example loan request process (as indicated by a process name 72) under development. The loan request process 72 leverages a loan request application folder 56, and associated loan request process instance folder 58.

In the present example embodiment, a developer has logged into the underlying PCS composer application 42 as a developer and has added a default folder 64 to store documents and any sub-folders 66, 68 to be used by the loan request process 72 under development.

To add one or more folders and/or associated documents, the developer may select a create-folder control 54. Selection of the create-folder control 54 results in display of an additional dialog box for facilitating creation of a document folder.

Note that in the present example embodiment, folders created using the create-folder control 54 are automatically integrated with the DCS 16 of FIG. 1 and may be stored among the folder structures and documents 24. Note that additional user options for adding folders for use by a particular PCS software application (wherein the folders have already been created by one or more users of a DCS) may also be provided.

In the present example embodiment, a folder hierarchy 62 is shown 62 to illustrate that a given folder 64 may be associated with or be included among a folder structure that includes or represents a folder hierarchy 62. The hierarchy 62 is structured in accordance with document and/or folder metadata, which may include, for example, folder name and folder position information describing the position of each particular folder 64-68 in the folder hierarchy 62. Additional examples of metadata that the DCS 16 and associated functionality 22 may use to characterize folder structures 24 and accompanying folders and documents include folder and/or document source, type, purpose, and so on. Furthermore, a list of one or more activities or software processes that will use the folder and/or document may also represent metadata that may be tracked and applied to folders, documents, and other data or content (e.g., computing objects) maintained by the DCS 16 of FIG. 1.

Accordingly, as part of integrating the PCS 18 and DCS 16 of FIG. 1, folders and documents 64-68 used by the PCS 18 of FIG. 1 may be placed into the DCS, e.g., among the folder structures and documents 24 of FIG. 1. Users, e.g., process developers, can now readily define a folder structure 62 that will be automatically created, maintained and access controlled by the PCS 18 using the DCS 16 of FIG. 1.

UI display screens, e.g., the first example UI display screen 40 of FIG. 2, are provided are provided to enable users to quickly update settings and permissions for documents 64-68 that will be used at runtime. Rich document metadata derived through use of functionality 22 afforded by the DCS 16 of FIG. 1 is leveraged by the PCS 18, including at runtime of a software application that has been developed using the PCS 18 that leverages functionality of the DCS 16 of FIG. 1.

FIG. 3 shows a second example UI display screen 80 that may be access from the first example UI display screen 40 of FIG. 2 and that may be used for editing root folder metadata. The second example UI display screen 80 may appear after user selection of the properties button 60 of FIG. 1.

In the present example embodiment, a developer has entered the name "LoanRequest" in an application folder field 82 as the name of a root folder for a loan request software application. The loan request software application is associated with an instance folder and instance identification, as specified via an instance folder field 84 and accompanying instance ID field 86.

The application folder (LoanRequest) specified in the application folder field 82 is the main folder that will contain all instances of the software application and accompanying processes associated with the application folder.

The instance folder (LoanRequest) specified via the instance folder field 84 will be dynamically or automatically created for each process instance. It will contain a set of folders defined by a developer using the process cloud service composer used to generate the second UI display screen 80 of FIG. 3 and the first UI display screen 40 of FIG. 2.

An additional UI drop-down menu 88 represents a UI control for enabling user selection of a startup folder. User selection of the drop-down menu 88 may display a list of existing options for startup folders. The currently selected startup folder is specified as a default folder. In the present example embodiment, the specified startup folder will be the only folder shown upon startup of a process.

A save option 90 enables saving of the folder metadata entered using the second example UI display screen 80 for editing root folders for documents.

Note that to implement software functionality associated with the various UI controls 82-90 of FIG. 3, the dialog box 80 may communicate with a JavaServer Pages (JSP) document (e.g., documentsPropertiesDialog.jspx), which may in turn communicate with a basic JavaBean (JB) (e.g., DocumentPropertiesDialog) of the PCS functionality 26 of FIG. 1 for implementing document properties dialog boxes and managing DCS general properties. The DocumentPropertiesDialog (BasicBean) may in turn communicate with a documents integration JB of the integration module 20 of FIG. 1.

In summary, the second example UI display screen 80 includes controls 82-90 for facilitating configuring DCS general properties. A user, e.g., developer, can access the properties 80 for the folders by clicking the properties button 60 of FIG. 1. The dialog box 80 enables the user to change general DCS metadata, i.e., properties, for the root folder, such as the application folder name, the instance folder name, and which folder will be available when a process is started.

FIG. 4 shows a third example UI display screen 100, which may be accessed from the first example UI display screen 40 of FIG., e.g., by selecting the create-folder control 54 thereof, and which may be used for specifying metadata for a folder to be created.

The third example UI display screen 100 represents a dialog box that includes various fields or controls 102-110 for specifying folder metadata and creating the specified folder. For example, a name field 102 provides a mechanism for enabling a developer or other authorized user to enter a folder name. A description field 104 enables entering of a description for the named folder. A folder access-type control 106 provides a drop-down menu 108 for enabling user selection of a folder-access type. Examples of folder access types include contributor (which has been selected), downloader, viewer, and none.

After specification of metadata via the fields and controls 102-108, the developer may select a create button 110 to cause creation of a folder in accordance with the specified metadata (e.g., folder name, description, and access type).

Note that to implement software functionality associated with the various UI controls 102-110 of FIG. 4, the dialog box 80 may communicate with a JavaServer Pages (JSP) document (e.g., folderDialog.jspx), which may in turn communicate with a basic JavaBean (JB) of the PCS functionality 26 of FIG. 1 for implementing folder dialog boxes. The JB may in turn communicate with the integration functionality 20 of FIG. 1, which may include the documents integration JB (e.g., DocumentsIntegrationBean). The DocumentsIntegrationBean in turn communicates with a documents integration controller, which may in turn communicate with a documents integration state manager, which in turn may communicate with a DCS service that includes code for selectively accessing a project API.

If the DCS service has been registered in a workspace for a particular software application development project by a user of the developer system(s) 14 of FIG. 1, then the DCS service will be enabled for that project. However, preexisting or legacy software applications and associated processes may not, by default, be enabled for integration with the DCS 16 of FIG. 1. However, UI controls and associated options for integrating legacy software applications with the DCS 16 of FIG. 1 may be provided via the PCS functionality 26 of FIG. 1.

Note that the PCS functionality 26 and integration functionality 20 of FIG. 1 used to implement the create-folder dialog box 100 of FIG. 4 may also be used to facilitate editing a folder. In the present example embodiment, a user may select a folder, e.g., the default folder 64 of FIG. 1, to trigger display of an edit-folder dialog box.

The resulting edit-folder dialog box (used for editing folder properties) may appear similar to the create-folder dialog box 100 of FIG. 4 used to create a folder, but with the exception that the create button 110 of FIG. 4 is replaced with a save button, and the title of the resulting dialog box may appear as "Edit Folder," as opposed to "Create Folder."

In summary, to create a folder, the developer or other authorized user enters a unique name in the name field 102 of the create-folder dialog box 100 and specifies a default folder access type using the access-type control 106.

Figure 5:
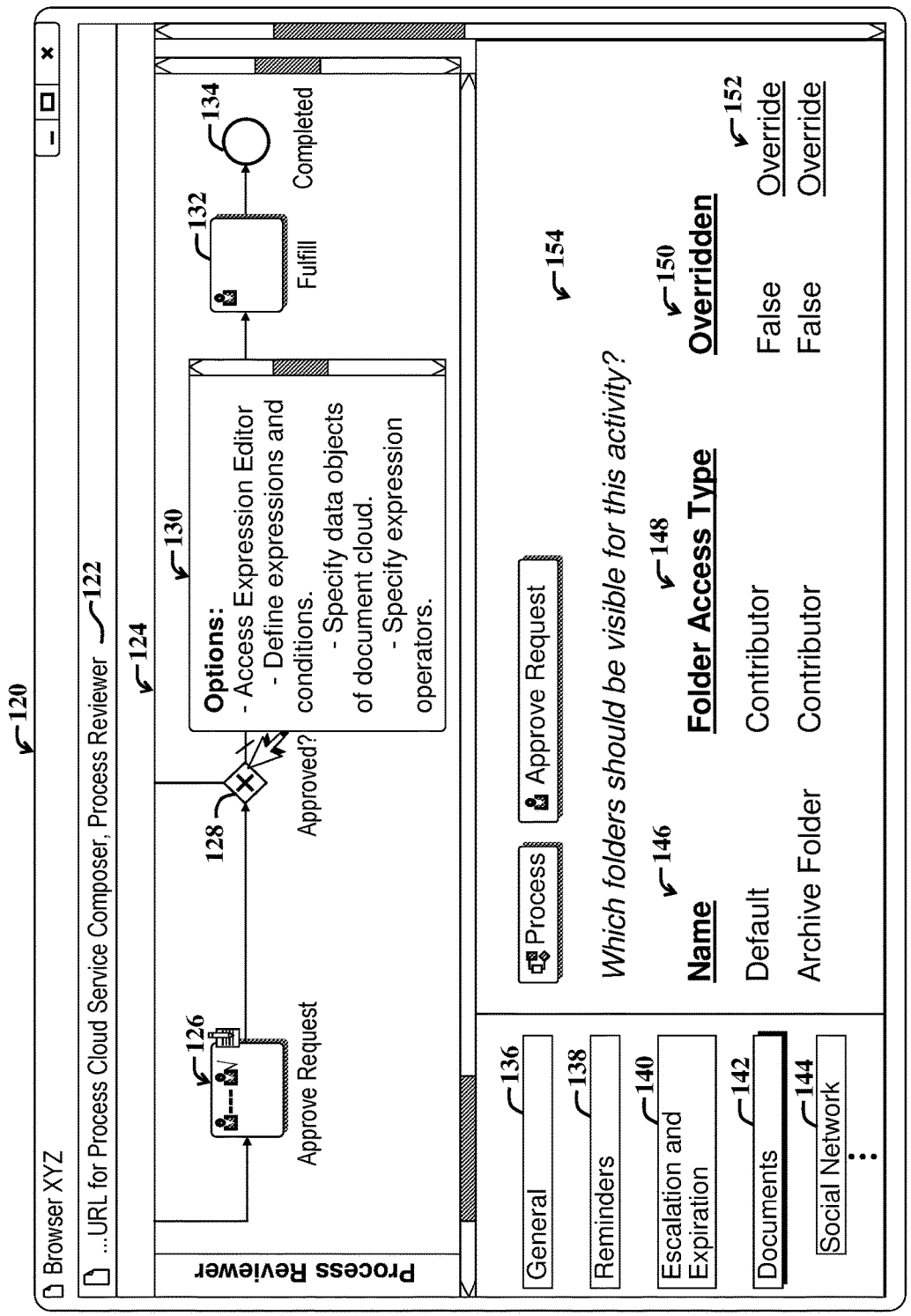

FIG. 5 shows a fourth example UI display screen 120, which includes various UI controls and associated options, e.g., for specifying document folders and folder access types (e.g., via access-type override controls 152); specifying gateway conditions based on metadata (e.g., via an example options menu 130), and so on.

The fourth example UI display screen 120 is presented via a browser window after a user, e.g., developer has navigated to a URL 122 associated with a process reviewer portion of the associated process composer software application. Note that the process composer software application and associated development environment and functionality may be provided via the PCS functionality 26 of FIG. 1.

A portion of an example process of a process-based software application is shown in a process reviewer section 124. The example process is modeled via various BPMN elements, including an approve-request activity element or object 126, an approval-checking gateway object 128, a fulfill (approval request) activity object 132, and an end event object 134.

For illustrative purposes, an example pop-up menu 130 is shown being activated upon user selection of the approval-checking gateway object 128. Note that in practice, other mechanisms, e.g., UI controls, may be used to access similar options 130 in different ways, without departing from the scope of the present teachings. The exact organization of UI controls and ways to navigate to and access the UI controls and associated options are implementation-specific and may vary depending upon the needs of a given implementation.

Example UI controls in the pop-up menu 130 include an option to access an expression editor. Accessing the expression editor may involve displaying an additional dialog box with various UI controls and associated options, e.g., for defining expressions and conditions for the gateway object 128; specifying data objects of a DCS to be used by or otherwise accessed by the gateway object 128 and associated conditions and/or expressions; specifying expressions and accompanying operators, and so on.

Note that while the example menu 130 is shown presenting various UI controls and associated options for the gateway object 128, that similar and/or additional UI controls and options may be provided via other menus, e.g., which may be accessible via user selection (e.g., via right-clicking) of one or more of the other process objects 126, 132, 134.

Below the process reviewer section 124, various UI controls 136-144 for selecting and specifying general properties 136, reminders 138, escalation and expiration data 140 for the process, documents 142, social network content 144 for the process, and so on, are provided. In the present example embodiment, the developer has selected the documents option 142, resulting in display of a documents section 154.

The documents section 154 lists document names 146, corresponding folder access type 148, and whether the folder access type has been overridden 150, along with UI controls 152 to enable a developer to selectively override the settings shown in the overridden column 150, i.e., to selectively override the folder access type 148. User selection of one or more of the override controls 152 may trigger display of an additional dialog box with additional UI controls and associated options for specifying the name of a folder whose access type is to be overridden, and which new access type to apply to the folder so as to override the preexisting or default specified folder access type.

The overriding of a folder access type may involve employing the PCS functionality 26 and integration functionality 20 of FIG. 1 to communicate with a documents controller, documents integration state manager, DCS service manager, project API, JavaBeans (JBs), JavaServer Pages (JSP) files, and so on, as needed to coordinate the change in document access type between the PCS 18 and DCS 16 of FIG. 1. Those skilled in the art with access to the present teachings may readily implement the appropriate functionality and integration modules for overriding document and/or folder access type, without undue experimentation.

Accordingly, folder access properties may be changed for a given process or activity. The default folder access type and associated properties can be overridden, e.g., for a human task. A documents tab or section 154 may list folders that are available, and allow the user to override the default settings, including as to whether the folder is visible or not during running of the associated process or activity. When the user clicks to override (e.g., by selecting one of the override options 152), another dialog box may open to allow the user to change the access to the folder and associated properties.

Note that the various example UI controls 130 shown for the gateway object 128 are illustrative and may vary and/or otherwise be augmented. For example, one or more of the UI controls 130 may be used to display additional dialog boxes with additional UI controls, e.g., UI controls to facilitate creation of an expression in a PCS for any gateway condition or activity based on one or more attributes of one or more documents, thereby enabling decisions and data updates to be based on the attributes. Additional UI controls may facilitate routing a process flow of the software application and associated process(es) to different sets of tasks or activities (e.g., loan processing departments) based on one or more attributes (e.g., long term custom attributes, e.g., credit score) of one or more documents used by the process flow.

In an example home loan processing flow use case, different types of documents must be filed and reviewed. This includes (a) applicant related documents such as bank statements, pay stubs, W2s, credit reports, and (b) property related documents, such as title, appraisal. Different roles and/or organizations, such as loan officer, loan processor, and loan underwriter. The loan underwriter will review the documents and approve the loan. Once approved, additional documents, such as loan documents are created, signed and approved.

These review and approval activities can require segregating documents into different folders, moving them into approved folders, and so on, during the loan processing flow. Conventionally, this is not possible using preexisting PCS, where attachments are stored in database BLOB and represented as a flat list without any metadata information and organization structure. Integrating the PCS 18 of FIG. 1 with the DCS 16 of FIG. 1 enables providing the PCS 18 the rich document management capability needed for such flows.

Additional example use cases, interaction types, and associated example process patterns are provided in Table 1 below.

TABLE 1

| Type of Interaction/Use | Example Process Patterns | Example Use Case |
|---|---|---|
| Create place holders for folders and/or documents in a process flow. | Create a folder structure as defined in metadata (e.g., a simple top level or hierarchical folder structure) during process instantiation and orchestration. The folder | Loan Approval documents organized in hierarchical folders based on document metadata, including document source, |

TABLE 1-continued

| Type of Interaction/Use | Example Process Patterns | Example Use Case |
|---|---|---|
| | names can be created dynamically based on variables populated with expressions. | type, purpose and which activities will use them. |
| Use existing folders/documents in a process flow. | Users can choose existing folders for attachments needed during the process flow. | Customers who use DOCS from outside of PCS and have a standard folder organization mechanism for documents and want to use those directly for use in the process flow. |
| Create folder/document attribute-based expressions (also called metadata-based expressions) in a process flow. | Create expressions in PCS for any gateway condition or activity based on attributes of documents so decisions and data updates can be based on the attributes in accordance with the gateway condition. | Based on document attributes (e.g., long term custom attributes such as credit score) route the flow to different set of tasks/activities (loan processing departments) |
| End user initiates folder/document operations from a workspace UI. | Users can browse, create, delete, and/or download folders and/or documents. These documents may be shared with other participants Who are part of the associated task and/or process. Security of folders and/or documents can be handled such that the same set of access permissions is permitted both in PCS and DOCS (in accordance with a unified security model. | Request for Proposal (RFP) process, where there is a lot of collaborative activity around documents that will require the creation, deletion, and/or sharing of different folders and/or documents until the final RFP package is created. |

Figure 6:
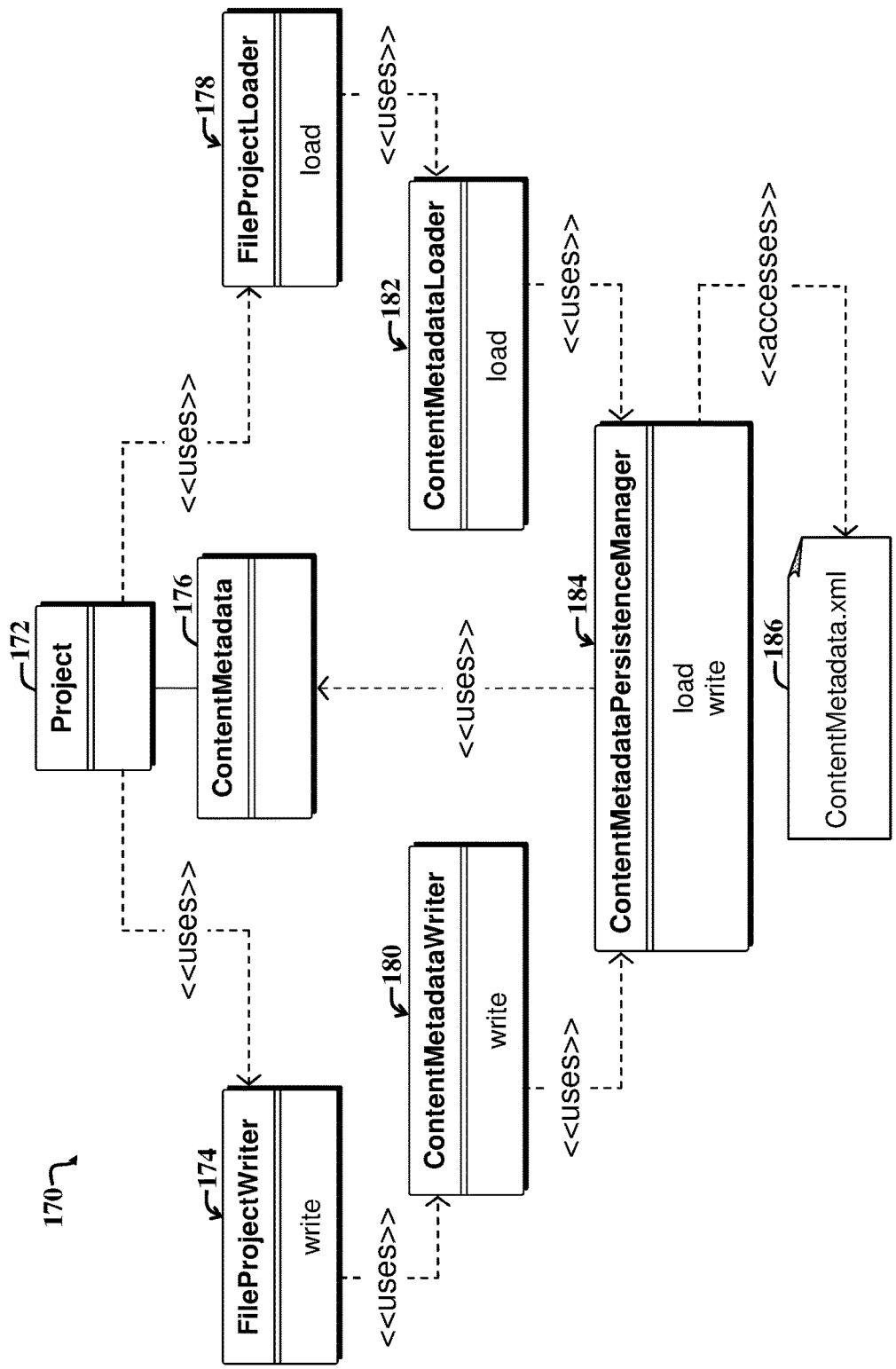
FIG. 6 is a block diagram showing example modules usable to facilitate persistence management for a particular project (e.g., process-based software application) and which uses metadata available through a document cloud.

FIG. 6 is a block diagram showing example modules (e.g., programming language classes, methods, and associated functionality and/or data) 170 usable to facilitate persistence management for a particular project (e.g., process-based software application) and which uses metadata available through a document cloud.

A given project 172, which may include various files and documents specifying process flows, documents to access, and so on. The documents, files, and associated folders are described by content metadata 176. The content metadata 176 can be used by a content metadata persistence manager 184, which can access a content metadata file 186.

To write files, the project 172 uses a file project writer 174, which in turn uses a content metadata writer 180 to write metadata for a written file. The content metadata writer 180 uses the content metadata persistence manager 184, which in turn uses the content metadata 176.

To load files, the project 172 uses a file project loader 178, which in turn uses a content metadata loader 182 to load content metadata describing the loaded file. The content metadata loader 182 also uses the content metadata persistence manager 184.

Note that the various modules 174-186 may be implemented via the document management functionality 22 of FIG. 1 and used by the project 172 via one or more APIs or other connectors of the integration module 20.

Figure 7:
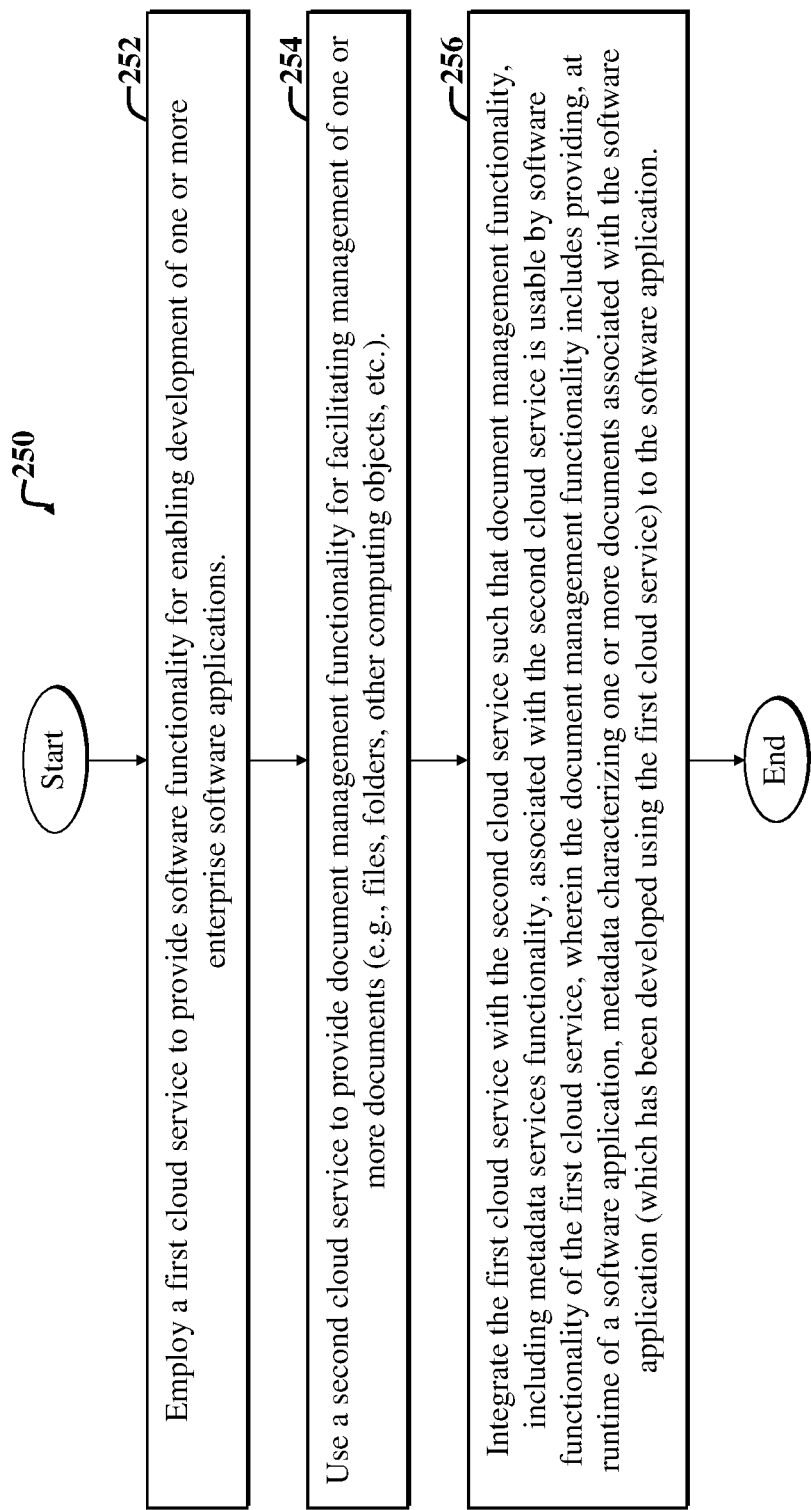
FIG. 7 is a flow diagram of an example method implementable via the embodiment of FIG. 1 for leveraging functionality of a document cloud for use by functionality and processes developed via a process cloud.

FIG. 7 is a flow diagram of an example method 250 implementable via the embodiment 10 of FIG. 1 for leveraging functionality of a document cloud (e.g., the cloud 16 of FIG. 1) for use by functionality and processes developed via a process cloud. Accordingly, the method 250 facilitates development and deployment of a software application in a networked enterprise computing environment.

The example method 250 includes a first step 252, which involves employing a first cloud service, e.g., a process cloud service, to provide software functionality for enabling development of one or more enterprise software applications.

A second step 254 includes using a second cloud service (e.g., a document cloud service) to provide document management functionality for facilitating management of one or more documents (e.g., files, folders, other computing objects, etc.).

A third step 256 includes integrating the first cloud service with the second cloud service such that document management functionality associated with the second cloud service is usable by software functionality of the first cloud service. The document management functionality includes providing metadata characterizing one or more documents associated with a software application to the software application at runtime. The software application may be developed using a process cloud service that leverages document management and other functionality, including metadata services, of a document management cloud and associated service.

Note that the method 250 may be altered without departing from the scope of the present teachings. For example, additional steps may be provided; some steps may be altered, and so on.

For example, the example method 250 may be adjusted to further specify that the first cloud service includes a Process Cloud Service (PCS), and wherein the second cloud service includes a Document Cloud Service (DCS).

The third step 256 may further include providing one or more first UI controls or options to enable creation of one or more place holders in computer code of the software application. The one or more place holders specify a location in software code (e.g., in a process template) for one or more documents that are part of a process flow of the software application.

One or more second UI controls may facilitate creation of a folder structure defined by folder metadata during instantiation and orchestration of one or more processes of the software application. The example method 250 may further specify dynamic creation of one or more names for one or more folders of the folder structure based on one or more variables of the software application that have been populated with one or more software expressions.

The folder structure may include a hierarchy of folders. The hierarchy may be structured in accordance with document metadata. The document metadata may include various categories of metadata, such as document source, document type, document purpose, a listing of one or activities or software processes that will use the document, and so on.

One or more third UI controls may enable specifying that one or more existing documents or folders shall be used in a process flow of the software application.

One or more fourth UI controls may enable use of a preexisting document folder structure in a process or process flow of the software application. The preexisting document folder structure may have been initially constructed for organizing documents that were not specifically developed or designed for a given software process or process flow.

One or more fifth UI controls may facilitate creation of a folder or document attribute-based expressions in a process or process flow of the software application.

One or more sixth UI controls may facilitate creation of an expression in a PCS for any gateway condition or activity based on one or more attributes of one or more documents, thereby enabling decisions and data updates to be based on the attributes.

One or more seventh UI controls may facilitate routing a process flow of the software application to different sets of tasks or activities (e.g., loan processing departments) based on one or more attributes (e.g., long term custom attributes, e.g., credit score) of one or more documents used by the process flow.

Various additional UI controls or user options may be provided and include, but are not limited to: options to enable an end user to perform folder/document operations from a workspace UI display screen; options to browse, create, delete, download folders and/or documents, and so on.

The documents may be sharable with one or more participants of a task or process. Security of folders and/or documents may be handled using similar authentication functionality for a document cloud service as is used for the process cloud service.

A process flow of a software application implemented via embodiments discussed herein may include, for example, an RFP (Request for Proposal) process using documents that are subject to collaborative activity including sharing, creation, deletion, editing different folders and documents, until a final version of an RFP package defining the RFP process is created.

Documents may be represented as a first class collection under each application (project) so that the documents are accessible to both processes and associated tasks or activities. A standard document type business object may be created to capture all attributes related to a document.

A developer UI display screen and associated functionality may include various UI controls and associated options, including but not limited to: options to use existing folders and/or documents in a process flow of a software application; options to choose existing folders for attachments that are needed during a process flow; options to use a preexisting document folder structure to organize documents that are not specifically developed for a given process, but enabling the folder structure and organization mechanisms to be used in the process flow; options to create folder or document attribute-based expressions in a process flow; options to create an expression in a PCS for any gateway condition or activity based on attributes of documents, thereby enabling decisions and data updates to be based on the attributes; options to route a process flow to different sets of tasks or activities (e.g., loan processing departments) based on document attributes (e.g., long term custom attributes, e.g., credit score); options to enable end users to perform folder/document operations from a workspace UI display screen; options to browse, create, delete, download folders and/or documents, wherein the documents are sharable with one or more participants of a task or process, and so on.

An additional example method includes: using a business object to contain metadata related to a document, wherein the metadata includes document attributes; accessing a project (software application) developed using a PCS, wherein the project includes document folders specified using metadata; using a DCS to create the document folders in accordance with the metadata, wherein one or more processes of the project include one or more references to a business object for a document used by the one or more processes.

The additional example method may further include: updating folder attributes with identification information of one or more process cloud service objects, wherein a top level folder of a folder structure that includes one or more of the document folders is associated with the software application and is characterized by software application identification information, and wherein an instance of a folder for the software application is associated with process instance identification information maintained via one or more business objects associated with the instance of the folder.

Figure 8:
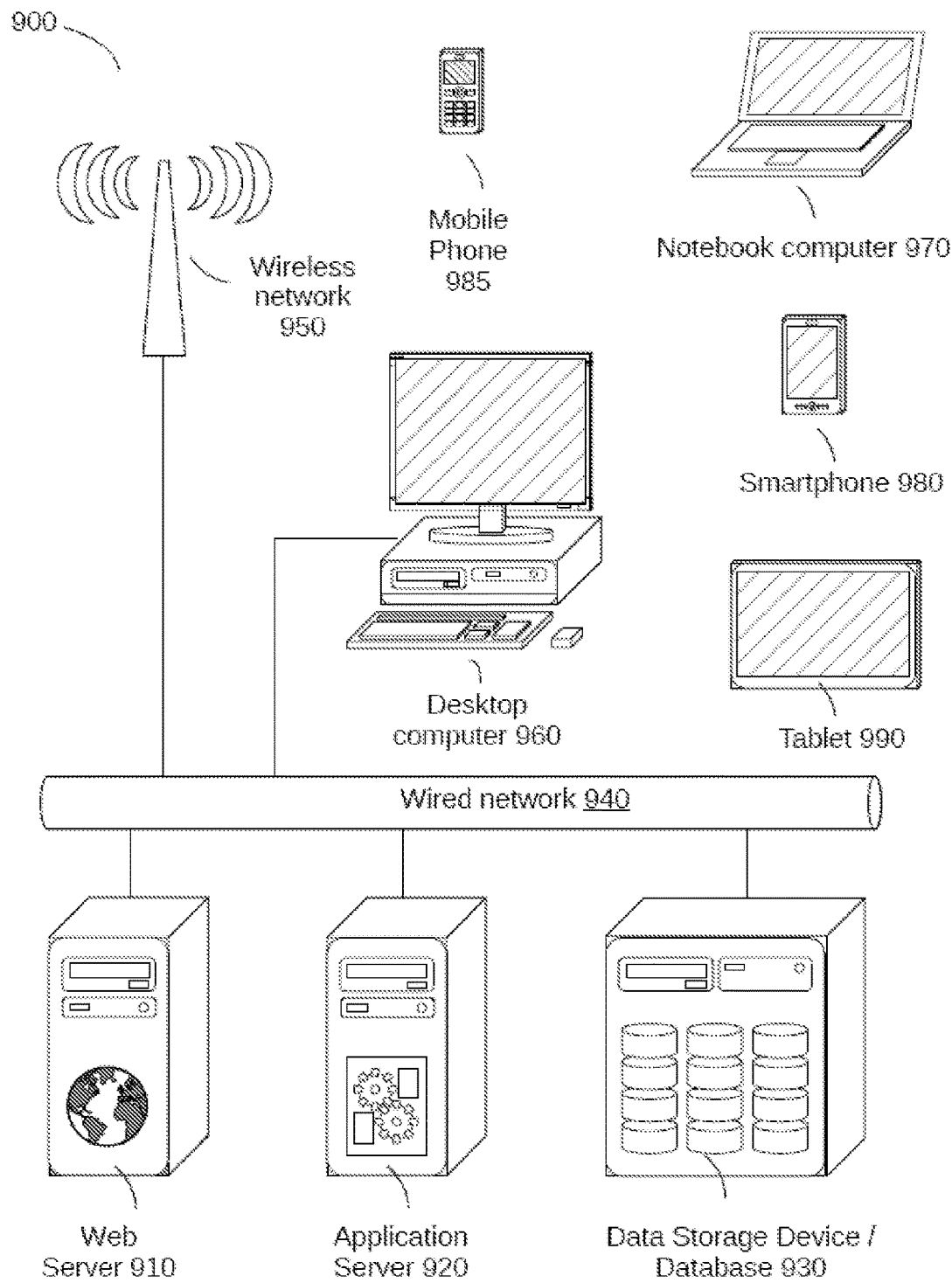
FIG. 8 is a general block diagram of a system and accompanying computing environment usable to implement the embodiments of FIGS. 1-7.

FIG. 8 is a general block diagram of a system 900 and accompanying computing environment usable to implement the embodiments of FIGS. 1-7. The example system 900 is capable of supporting or running various hardware and/or software modules and associated methods discussed with reference to FIGS. 1-7. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 8, the developer system(s) 14 and end user systems 12 of FIG. 1 may be implemented in whole or in part via one or more of the desktop computer 960, notebook computer 970, smartphone 980, mobile phone 985, tablet 990, of FIG. 8 and/or other computing devices.

In a particular example embodiment, the computing devices 960-990 run browsers, e.g., used to display the developer UI(s) 32, 34 of the end user system(s) and developer system(s) 14, respectively, of FIG. 1. Examples of UI display screens that may provide various UI controls and options, including the UI controls 34 of the developer system(s) 14 of FIG. 1, are shown in FIGS. 2-5.

In a particular example embodiment, browsers of the systems 12, 14 of FIG. 1 connect to the Internet, represented by the wired network 940 and/or wireless network 950 as shown in FIG. 8, to access one or more network-coupled servers, databases, and/or associated cloud-based functionality, as represented by the document cloud and accompanying DCS 16 and the process cloud and accompanying PCS 18 of FIG. 1, including document management functionality 22, 24 and folder structures and documents 24 of the DCS 16; process-based application development functionality 26 and accompanying process database 30 and runtime 28 of the PCS 18; and integration functionality 20 used to integrate the DCS 16 with the PCS 18.

Note that one or more of the web server 910, application server 920, and data storage device or database 930 shown in FIG. 8 may be used to host software corresponding to the modules 22-30 of FIG. 1, as detailed more fully below.

In the particular example embodiment, the document management functionality 22, process-based application development functionality 26, integration therebetween 20, DCS folder structures and documents 24, business process management runtime 28, and process database 30 run in an integrated cloud computing environment that includes a collection of plural web servers 910, application servers 920, and data storage devices 930 shown in FIG. 8.

For example, in the particular example embodiment, the process-based application development functionality 26 (e.g., PCS composer) of FIG. 1 runs on a process cloud 18 that communicates with a document cloud 16 via an integration mechanism 20, e.g., middleware, APIs, web services, etc. The document cloud 16 maintains the folder structures and documents 24 of FIG. 1 via data storage devices 930 of FIG. 8.

The process cloud 18 in combination with the document cloud 16 acts as an overall cloud that supports development, deployment, dynamic adaptation, and use of dynamic software applications and accompanying models (e.g., the process represented by the BPMN model elements 126-134 of FIG. 5) implemented via the runtime 28 of FIG. 1. Note that the runtime 28 of FIG. 1 may run on one or more application servers 920, as shown in FIG. 8, and may use and access the process database 30, which may be maintained via one or more of the data storage devices 930 of FIG. 8.

In general, software developers e.g., users of the developer system(s) 14 of FIG. 1, may subscribe to certain cloud services to facilitate development of software applications and storage of associated files. A cloud service that is configured for software application or process flow development and/or implementation is called a PCS herein.

A PCS may employ a networked database, e.g., the data storage device 930 of FIG. 8, to store files and other objects used by a given software program being developed. Note that in various embodiments discussed herein, the data storage device(s) 930 of FIG. 8 also maintain the folder structures and documents 24 of the DCS 16, which are usable by functionality 26, 28 of the PCS 18 of FIG. 1.

In general, server-side development environments may be accessible to developers via browsers. The development environments may be backed by the PCS, such that developed software application files are stored in the PCS database corresponding to the one or more of the data storage devices 930 of FIG. 8.

A document cloud may include document management functionality in communication with folder structures and documents and may incorporate functionality for adding rich metadata documents and folders. The document management functionality may include MetaData Services (MDS) for characterizing folders and documents and associated structures with various types of metadata. The document management functionality may further include software (which may include a combination of webpage code from a web server 910 of FIG. 8 and supporting application code of an application server 920 of FIG. 8, where the webpage code may call the application code using web services, APIs, etc.) for generating one or more customer UI display screens, e.g., UI display screens presented via browsers of the developer system(s) 14 and end-user system(s) 12 of FIG. 1.

In the particular example embodiment, the UI display screens 32, 34 of the systems 12, 14 of FIG. 1 include accompanying UI controls and associated options. Example options include options to browse, create, delete, define, upload, download, etc., folders, structures, and documents, etc., as maintained via the folder structures and documents.

Note that in the particular example embodiment, browsers used by the developer system(s) 12 and end user system(s) 12 of FIG. 1, interface with web servers 910 shown in FIG. 8 to access websites and accompanying webpage code, which is backed by applications used to implement the modules 22-30 of FIG. 1. The webpage code of the web servers 910 of FIG. 8 use web services, APIs, and/or other interfacing mechanisms to communicate with application software hosted on application servers 920 of FIG. 8 of the cloud, which includes a collection of web servers 910, application servers 920, and data storage devices 930 of FIG. 8.

Note that various embodiments discussed herein may provide substantial benefits in terms of providing efficiencies in systems and methods that achieve a new and useful end as it pertains to new software adaptability. In particular, certain embodiments discussed herein uniquely leverage document management functionality and associated metadata tracking and handling mechanisms afforded by a DCS to facilitate software development and implementation via a PCS.

Accordingly, various embodiments provide new capabilities for efficient software implementation, in part by uniquely leveraging integration between PCS functionality 26 and DCS functionality 22, as shown in FIG. 1.

Figure 9:
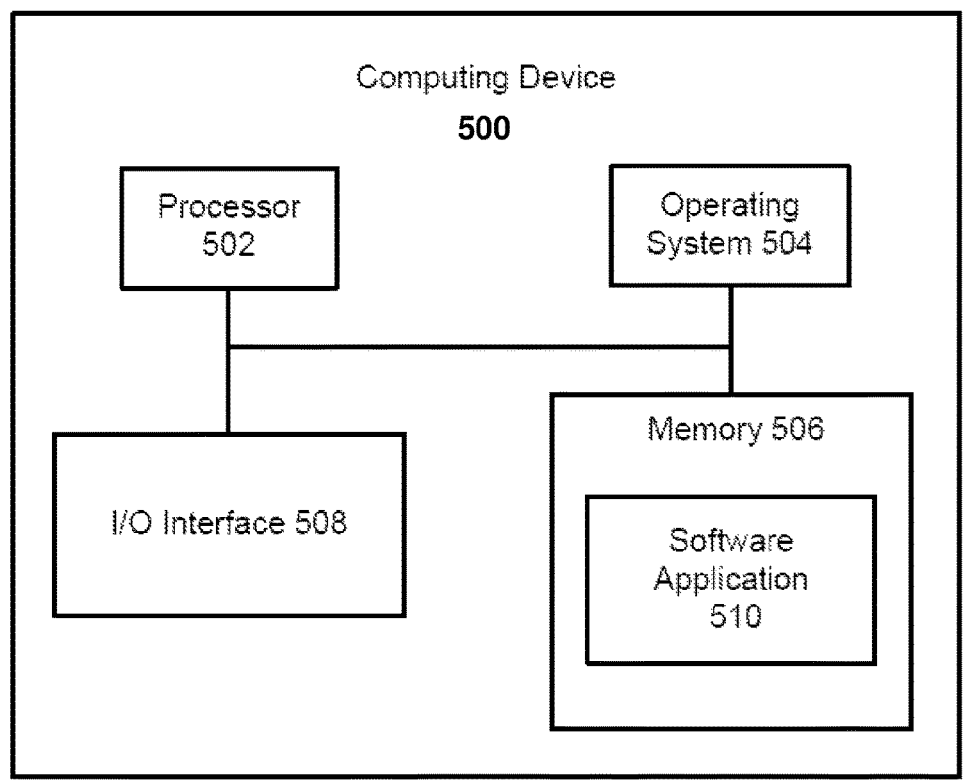
FIG. 9 is a general block diagram of a computing device usable to implement the embodiments of FIGS. 1-8.

FIG. 9 is a general block diagram of a computing device 500 usable to implement the embodiments described herein. While the computing device 500 of FIG. 9 may be described as performing one or more of the steps in the embodiments herein, in other embodiments any suitable component or combination of components of the computing device 500 or any suitable processor or processors associated with system 500 may facilitate performing the steps.

FIG. 9 illustrates a block diagram of an example computing system 500, which may be used for implementations described herein. For example, computing system 500 may be used to implement server devices 910, 920 of FIG. 8 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 9 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments discussed herein involve integrating or leveraging functionality of a document services cloud for use by a process cloud, embodiments are not limited thereto. For example, a given process cloud may further leverage additional functionality of other clouds in accordance with embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer readable medium including instructions executable by one or more processors for:
    employing a first cloud service to provide software functionality for enabling development of one or more software applications;
    using a second cloud service to provide document management functionality for facilitating management of one or more documents, wherein the document management functionality includes providing metadata characterizing one or more documents associated with a software application developed using the first cloud service, wherein the metadata is provided to the software application at a runtime of the software application; and
    modifying one or more of the services with one or more of middleware, application programming interfaces, or web services to integrate the first cloud service with the second cloud service such that document management functionality associated with the second cloud service is usable by software functionality of the first cloud service.

2. The non-transitory computer readable medium of claim 1, wherein the first cloud service includes a Process Cloud Service (PCS), and wherein the second cloud service includes a Document Cloud Service (DCS).

3. The non-transitory computer readable medium of claim 2, wherein integrating includes:
providing one or more first User Interface (UI) controls for enabling creation of one or more place holders in computer code of the software application, wherein the one or more place holders are for one or more documents that are part of a process flow of the software application.

4. The non-transitory computer readable medium of claim 3, further including:
providing one or more second UI controls for facilitating creation of a folder structure defined by folder metadata during instantiation and orchestration of one or more processes of the software application.

5. The non-transitory computer readable medium of claim 4, further including:
dynamically creating one or more names for one or more folders of the folder structure based on one or more variables of the software application that have been populated with one or more software expressions.

6. The non-transitory computer readable medium of claim 4, wherein the folder structure includes a hierarchy of folders, and wherein the hierarchy is structured in accordance with document metadata.

7. The non-transitory computer readable medium of claim 6, wherein the document metadata includes one or more of the following categories of metadata:
document source, document type, document purpose, and list of one or activities or software processes that will use the document.

8. The non-transitory computer readable medium of claim 3, further including:
providing one or more third UI controls to enable specifying that one or more existing documents or folders shall be used in a process flow of the software application.

9. The non-transitory computer readable medium of claim 8, further including:
providing one or more fourth UI controls to enable use of a preexisting document folder structure in a process or process flow of the software application, wherein the preexisting document folder structure has been initially constructed for organizing documents that are not specifically developed or designed for a given software process or process flow.

10. The non-transitory computer readable medium of claim 2, further including:
providing one or more fifth UI controls to facilitate creation of a folder or document attribute-based expressions in a process or process flow of the software application;
providing one or more sixth UI controls to facilitate creation of an expression in a PCS for any gateway condition or activity based on one or more attributes of one or more documents, thereby enabling decisions and data updates to be based on the attributes; and
including providing one or more seventh UI controls to facilitate routing a process flow of the software application to different sets of tasks or activities (e.g., loan processing departments) based on one or more attributes (e.g., long term custom attributes, e.g., credit score) of one or more documents used by the process flow.

11. A method for facilitating development of a software application in a networked enterprise computing environment, the method comprising:
employing a first cloud service to provide software functionality for enabling development of one or more enterprise software applications;
using a second cloud service to provide document management functionality for facilitating management of one or more documents; and
modifying one or more of the services with one more of middleware, application programming interfaces, or web services to integrate the first cloud service with the second cloud service such that document management functionality associated with the second cloud service is usable by software functionality of the first cloud service, wherein the document management functionality includes providing metadata characterizing one or more documents associated with a software application developed using the first cloud service to the software application at runtime of the software application.

12. The method of claim 11, wherein the first cloud service includes a Process Cloud Service (PCS), and wherein the second cloud service includes a Document Cloud Service (DCS).

13. The method of claim 12, wherein integrating includes:
providing one or more first User Interface (UI) controls for enabling creation of one or more place holders in computer code of the software application, wherein the one or more place holders are for one or more documents that are part of a process flow of the software application.

14. The method of claim 13, further including:
providing one or more second UI controls for facilitating creation of a folder structure defined by folder metadata during instantiation and orchestration of one or more processes of the software application.

15. The method of claim 14, further including:
dynamically creating one or more names for one or more folders of the folder structure based on one or more variables of the software application that have been populated with one or more software expressions.

16. The method of claim 14, wherein the folder structure includes a hierarchy of folders, and wherein the hierarchy is structured in accordance with document metadata.

17. The method of claim 16, wherein the document metadata includes one or more of the following categories of metadata:
document source, document type, document purpose, and list of one or activities or software processes that will use the document.

18. The method of claim 13, further including:
providing one or more third UI controls to enable specifying that one or more existing documents or folders shall be used in a process flow of the software application.

19. The method of claim 18, further including:
providing one or more fourth UI controls to enable use of a preexisting document folder structure in a process or process flow of the software application, wherein the preexisting document folder structure has been initially constructed for organizing documents that are not specifically developed or designed for a given software process or process flow.

20. An apparatus for facilitating development of a software application in a networked enterprise computing environment, the apparatus comprising:
one or more processors;
a tangible processor-readable storage device including instructions for:
employing a first cloud service to provide software functionality for enabling development of one or more enterprise software applications;
using a second cloud service to provide document management functionality for facilitating management of one or more documents; and
modifying one or more of the services with one or more of middleware, application programming interfaces, or web service to integrate the first cloud service with the second cloud service such that document management functionality associated with the second cloud service is usable by software functionality of the first cloud service, wherein the document management functionality includes providing metadata characterizing one or more documents associated with a software application developed using the first cloud service to the software application at runtime of the software application.

* * * * *

UNITED STATES PATENT AND TRADEMARK OFFICE
CERTIFICATE OF CORRECTION

| | |
|---|---|
| PATENT NO. | : 10,320,887 B2 |
| APPLICATION NO. | : 15/498125 |
| DATED | : June 11, 2019 |
| INVENTOR(S) | : Ron et al. |

It is certified that error appears in the above-identified patent and that said Letters Patent is hereby corrected as shown below:

In the Drawings

On sheet 1 of 8, in FIG. 1, under Reference Numeral 32, Line 5, delete "doc.s," and insert -- docs, --, therefor.

In the Specification

In Column 7, Line 16, after "employ" insert -- UI --.

In Column 16, Line 52, after "or" insert -- more --.

In the Claims

In Column 23, Line 36, in Claim 7, after "or" insert -- more --.

In Column 24, Line 13, in Claim 11, delete "one more" and insert -- one or more --, therefor.

In Column 24, Line 53, in Claim 17, after "one or" insert -- more --.

In Column 25, Line 15, in Claim 20, delete "web service" and insert -- web services --, therefor.

Signed and Sealed this
Twenty-eighth Day of July, 2020

Andrei Iancu
*Director of the United States Patent and Trademark Office*